US008433244B2

(12) United States Patent
Liu

(10) Patent No.: US 8,433,244 B2
(45) Date of Patent: Apr. 30, 2013

(54) ORIENTATION BASED CONTROL OF MOBILE DEVICE

(75) Inventor: Eric Liu, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1144 days.

(21) Appl. No.: 12/211,704

(22) Filed: Sep. 16, 2008

(65) Prior Publication Data

US 2010/0069115 A1 Mar. 18, 2010

(51) Int. Cl.
*H04B 7/00* (2006.01)
*H04M 3/493* (2006.01)

(52) U.S. Cl.
USPC ...................... 455/41.2; 455/414.2

(58) Field of Classification Search .............. 455/550.1, 455/556.1, 404.2, 41.2, 414.1, 414; 342/367, 342/357.08
See application file for complete search history.

(56) References Cited

U.S. PATENT DOCUMENTS 7,620,404 B2 * 11/2009 Chesnais et al. ........... 455/456.1
7,720,436 B2 *  5/2010 Hamynen et al. ............ 455/13.1
2007/0273583 A1 * 11/2007 Rosenberg .................... 342/367
2007/0275691 A1   11/2007 Boda
2008/0071559 A1    3/2008 Arrasvuori
2009/0119614 A1 *  5/2009 Tienvieri et al. .............. 715/786

FOREIGN PATENT DOCUMENTS

WO    WO 01/88687      11/2001
WO    WO 2008/152531  12/2008

OTHER PUBLICATIONS

International Search Report and Written Opinion for International Application PCT/US2009/056975, mail date Apr. 16, 2010, 6 pages.
Dan Charles, "GPS Is Smartening Up Your Cell Phone," printed from website http://www.npr.org/templates/story/story.php?storyId=6097216 on Sep. 3, 2008, 5 pages.

* cited by examiner

*Primary Examiner* — Nay A Maung
*Assistant Examiner* — Cindy Trandai

(57) ABSTRACT

A mobile device (e.g. a smartphone) controls a feature of a non-navigation related application (e.g. arrangement of menu items, function controlled by a quick launch key, etc.) based on the orientation of the device. These controls may be context-specific such that the orientation is only used to control the feature in particular contexts. Context may be implied from various factors such as time and date information, the location of the device, other devices in proximity to the device, etc. The particular commands to be controlled based on the orientation can be set using the device, or can be loaded from a data file provided from a third party.

25 Claims, 4 Drawing Sheets

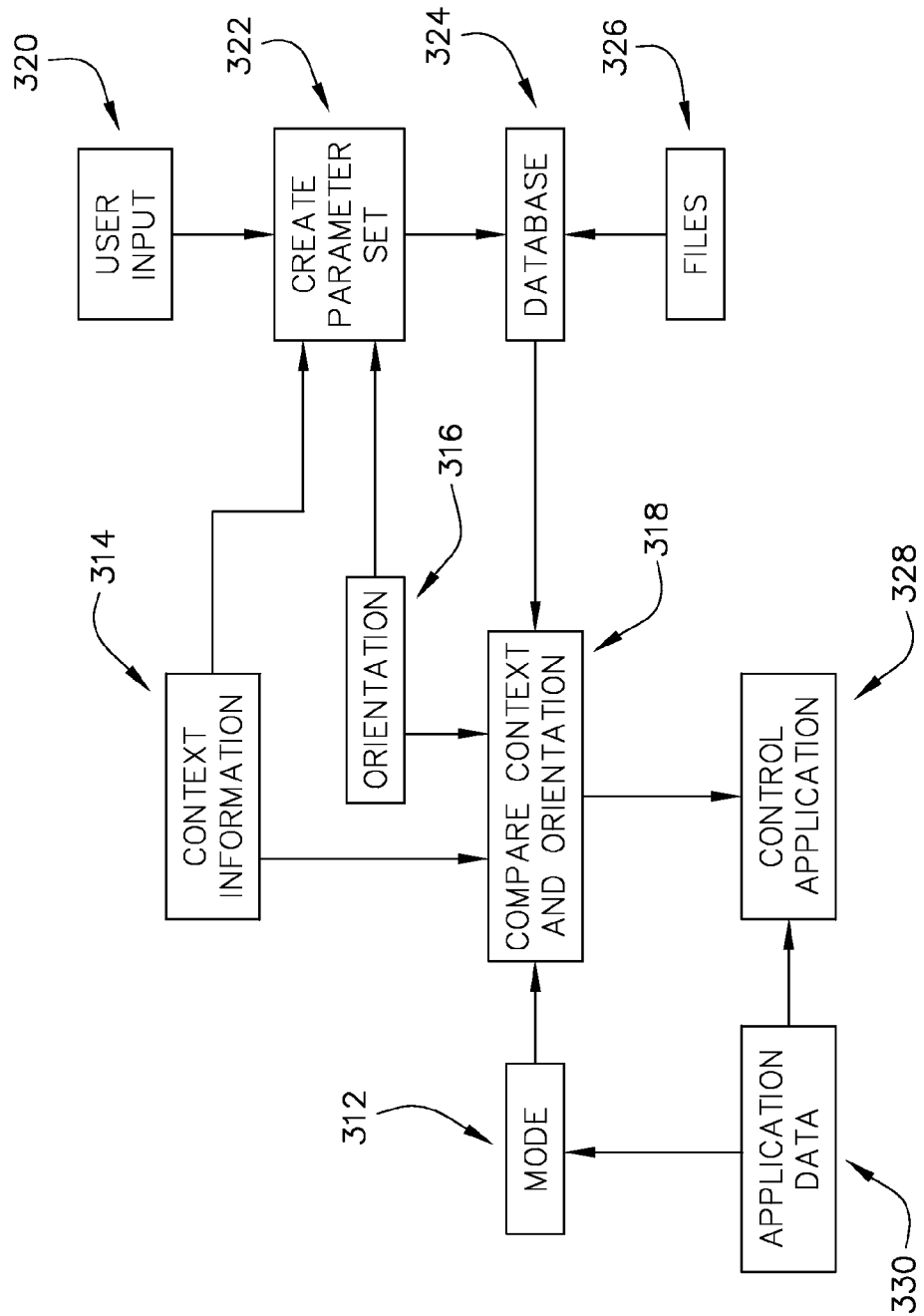

ORIENTATION BASED CONTROL OF MOBILE DEVICE

BACKGROUND

Mobile devices such as GPS systems include a GPS circuit for determining the location of the mobile device. Location information from a GPS circuit has been used to provide navigation data to mobile devices. GPS data has also been used to trigger events such as setting off alarms or reminders on a user's mobile device when the device enters proximity to a particular location, to add data to images taken by a mobile device, and to provide data to a remote server to track the mobile device.

Some GPS systems also include a compass to determine the orientation of the mobile device. The output of the compass may be used for various navigation functions such as displaying the direction of travel of the mobile device to a user, assisting the GPS circuit in providing positioning data (e.g. when the global positioning satellites are not visible such as in a tunnel—sometimes referred to as dead reckoning), and/or orienting the display of route data in a navigation application so that the route is displayed in the same perspective as the user's view of the streets.

Mobile devices such as smartphones are becoming capable of performing a large number of functions. These phones tend to be loaded with a large number of software applications for performing these different functions. A difficulty arises in making these applications easy for a user to access and use. To address this difficulty, smartphones will sometimes include shortcuts to commonly used applications, and may allow a user to choose which shortcuts to display. The shortcuts may be displayed on a main screen of the smartphone (e.g. a phone dialing application, a calendar application, an Internet search application, a wireless transceiver power-on/off application, etc.), and/or may be displayed as part of a menu that is quickly accessible from the main (and/or any other) screen of the smartphone (e.g. a quick start menu). Smartphones may also include reconfigurable buttons that allow a user to quickly access common commands. These commands may be application-specific (i.e. they vary from application to application) or may be common to all applications (e.g. a button configured by the user to be dedicated to launching a particular software application).

Options still have not been developed for using orientation and/or location data in different ways and options still have not been developed for additional ways to make mobile devices such as smartphones and GPS devices easier to use.

BRIEF DESCRIPTION OF THE DRAWINGS

FIGS. 1A-F illustrate a mobile computing device according to an exemplary embodiment;

FIG. 4 is a diagram of a method according to one embodiment.

DETAILED DESCRIPTION OF EXEMPLARY EMBODIMENTS

Figure 1E:
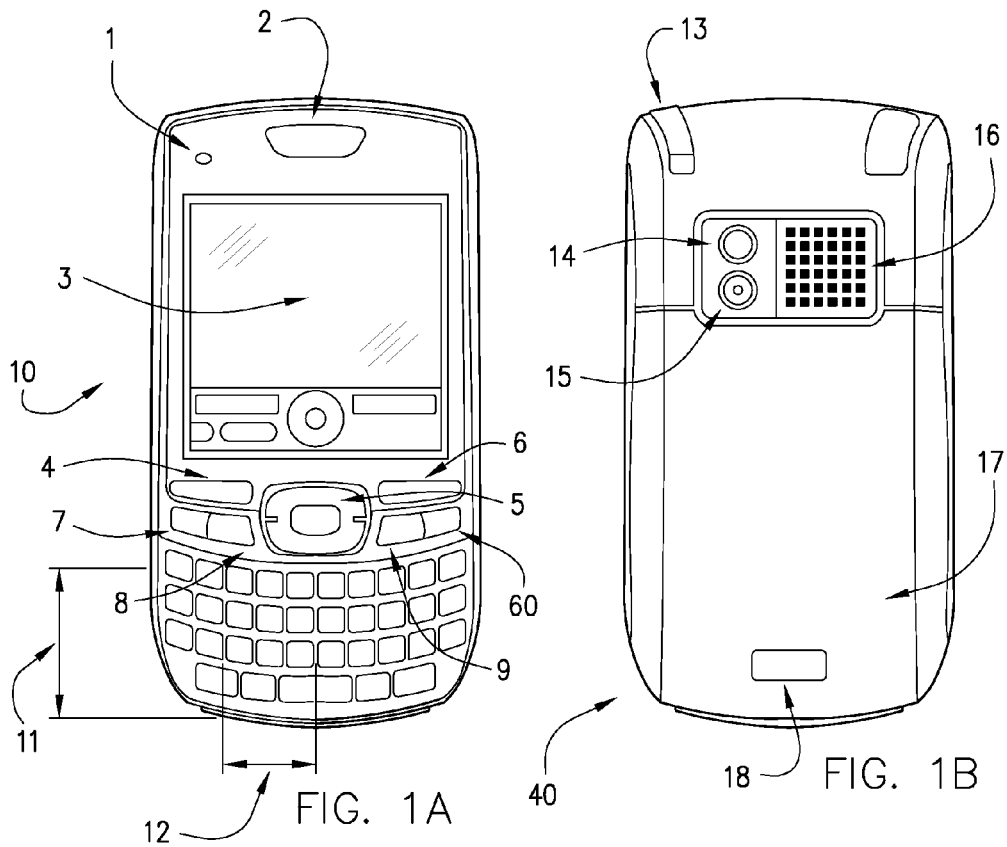
Figure 1E:
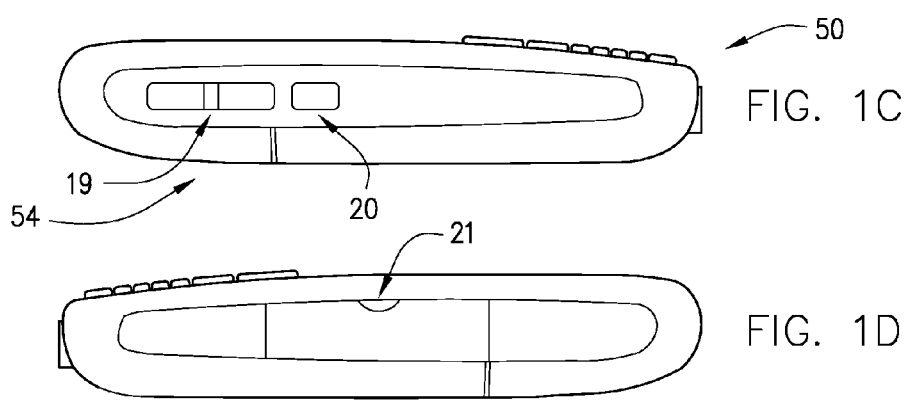
Figure 1E:
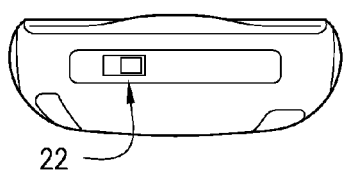
Figure 1F:
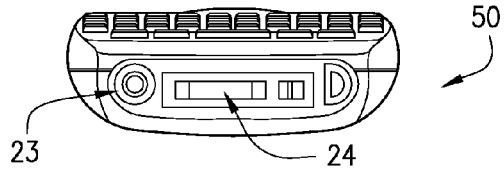
Figure 2:
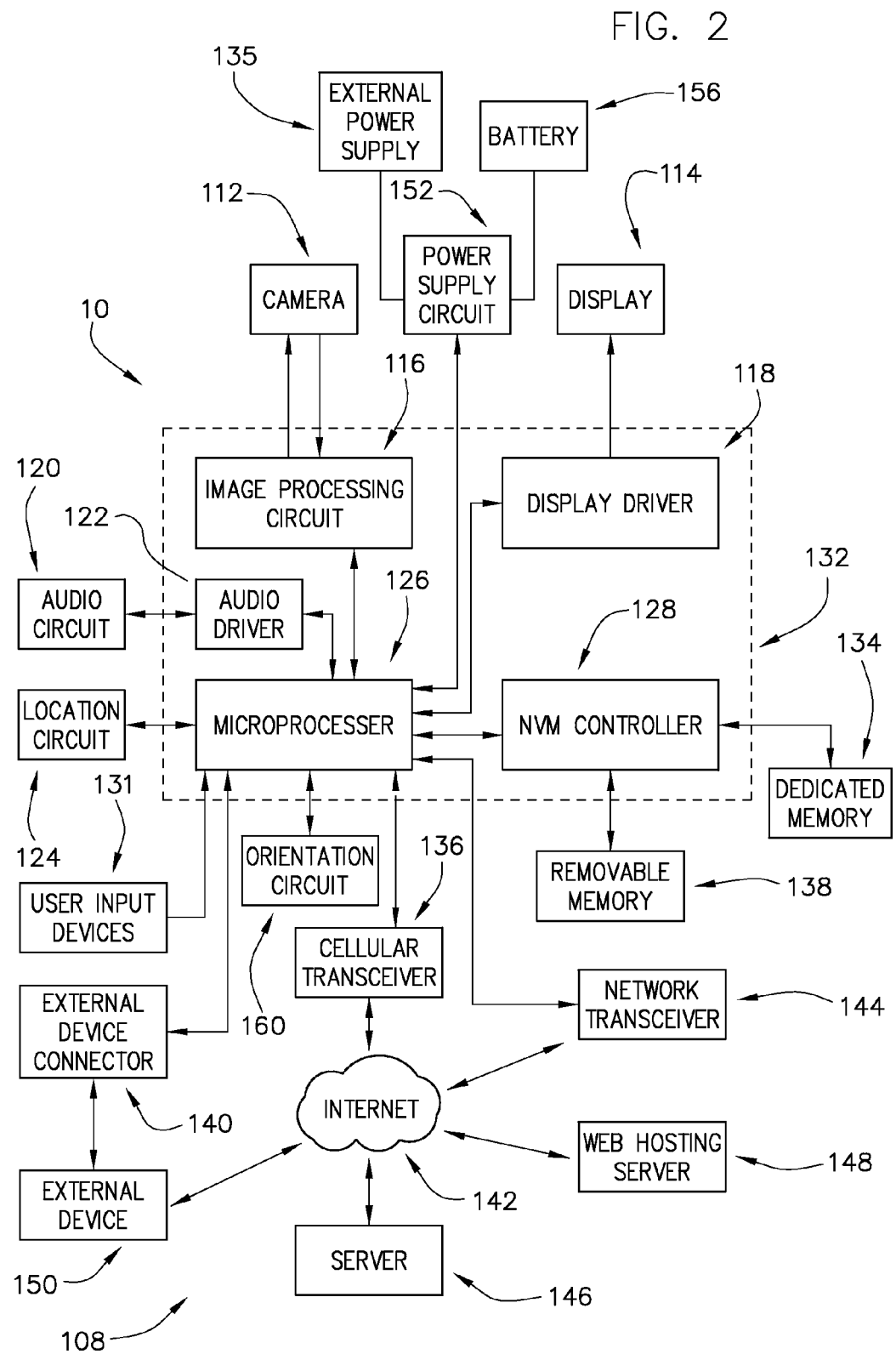
FIG. 2 is a system component block diagram of a system according to one exemplary embodiment.
Figure 3:
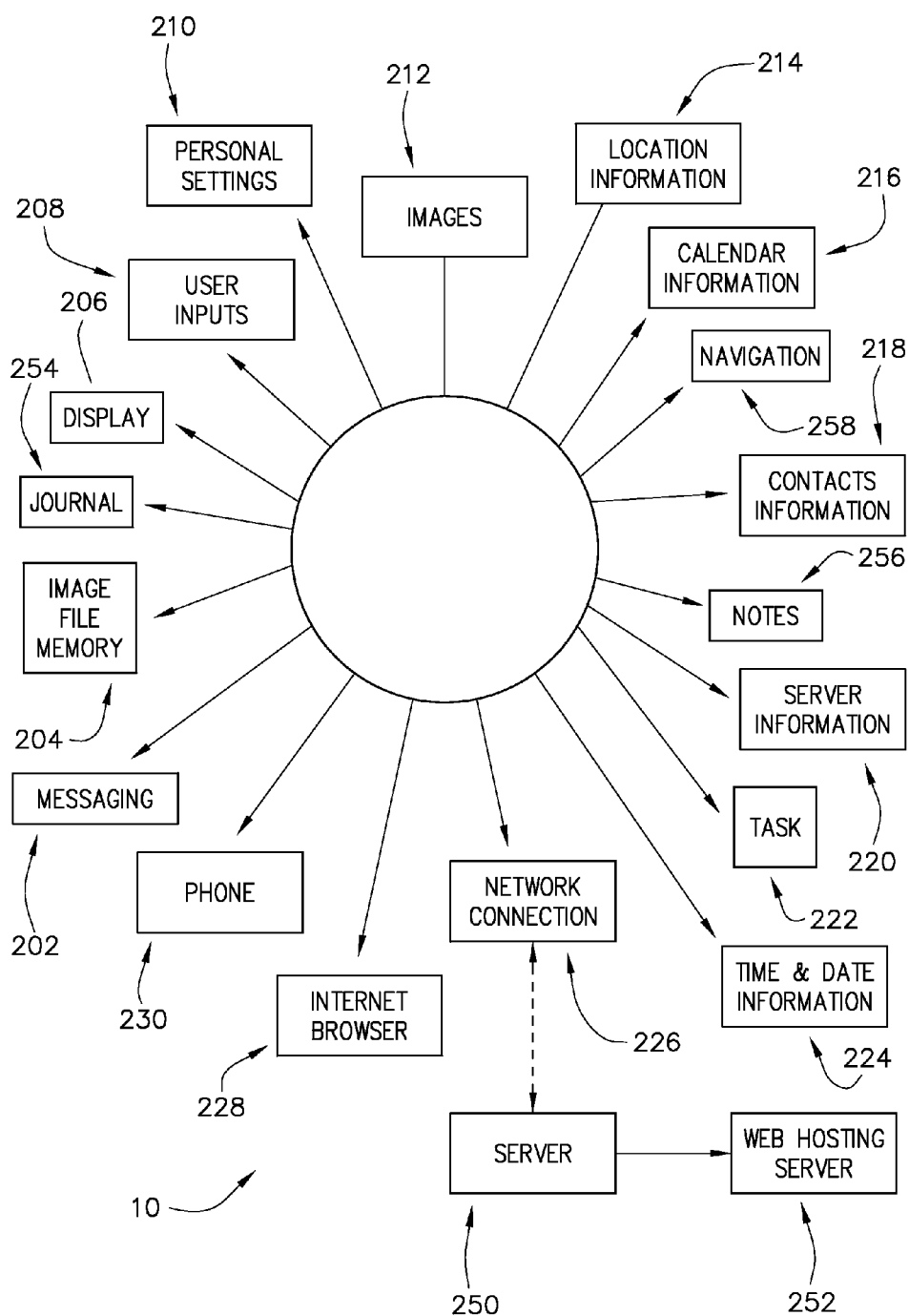
FIG. 3 is an application diagram of a system according to an exemplary embodiment.

Referring to FIGS. 1 and 2, a mobile electronic device 10 (e.g. a smartphone) includes a processing circuit 132 configured to implement a number of applications (see, e.g., the applications of FIG. 3). Processing circuit 132 is designed to control various other circuits such as information displayed on display 114. Processing circuit 132 may control this information based on inputs received from various user input devices 131 of device 10 (e.g. hard keys 4, 6, 8, 9, 11, 19, 20, 22, a touch screen 3, voice commands from a microphone 25 or a microphone connected to headset jack 23, and/or from some other user input device 131).

The actions taken by device 10 (e.g. commands executed, information displayed, etc.) in response to inputs on the user input devices 131 may be controlled based on the orientation of device 10. For example, device 10 may include an orientation circuit 160 such as a compass circuit designed to provide orientation information to processing circuit 132. As described in more detail with respect to FIG. 4, device 10 may be designed to take different actions at different orientations of device 10 which may be determined by data from the orientation circuit 160 of device 10.

These actions may further be limited based on the context associated with device 10. For example, context may include the location in which the device 10 is being used (e.g. pointing device 10 in different directions means different things in different places). The location of device 10 may be supplied by a location circuit 124 of device 10. As another example, context may also be provided by determining what other devices 150 are in the vicinity of device 10 (e.g. a Bluetooth stereo in proximity to device 10 may signal that the device is being pointed at the stereo to control the stereo). As another example, an array of devices can be detected and the relative strengths of signals from the array of devices can be used to determine one or both of the position of the device and the orientation of the device (e.g. if an antenna's reception of signals—e.g. strength—is better in one orientation with respect to a transmitting source than other orientations, the orientation of the device may be deduced through the detection of several devices and their signal strengths). Other devices 150 being in proximity may be determined by data received on a network transceiver 144 such as a Bluetooth transceiver and/or a WiFi transceiver. As still another example, context may be provided based on time information (e.g. certain actions may be taken during specific portions of the day and/or during certain dates so orientation information may be less helpful for taking those actions during other times). Time information may be provided by a clock circuit such as a clock of a microprocessor 126, from a GPS signal, and/or from another source. The time information may be compared to data stored in a calendar application 216 (FIG. 3) to provide further context to the orientation data.

The orientation data may be configured (and/or configurable) to control actions from a main screen and/or from any of the applications run by device 10, including the applications illustrated in FIG. 3.

Referring to FIG. 4, a method (which may be implemented by processing circuit 126 or a processing circuit of a server 146—FIG. 2, or some combination thereof) for controlling an application and/or other aspects of device 10 based on an orientation of device 10 includes receiving orientation information at block 316. Orientation information received at block 316 may be based on data from an orientation circuit 160 (e.g. may be the data directly from the orientation circuit, may be data processed—e.g. smoothed, filtered, etc.—based on data from the orientation circuit, etc.) and/or may be received from some other circuit (e.g. from a device 150 external to device 10). Orientation information may include the direction (e.g. a direction with respect to a horizontal plane of the Earth) in which a face (e.g. a top face (FIG. 1E), a back face (FIG. 1B), a front face (FIG. 1A), etc.) of device 10 is pointed.

The method further includes comparing at block 318 the orientation information received at block 316 to orientation information control data provided from a database (e.g. from memory 134, 138, from a server 146, etc.—see FIG. 2) at block 324. The orientation information used at block 318 may be based on any number of different resolutions of orientation. For example, the comparison may be based on an orientation resolution of less than or equal to one, five, and/or ten degrees, may be based on a rough orientation such as the cardinal points, cardinal and intercardinal points, a resolution of equal to or more than 20 degrees, 30 degrees, and/or 45 degrees. In some embodiments, the database may be limited to up to 12, 8, 6, and/or 5 orientations (e.g. in a given context) and/or may require that at least some orientations (e.g. orientations in the same context or that can not be differentiated except by orientation) linked to different actions be separated by at least 10, 20, 30, 40, 50, and/or 60 degrees from another orientation.

The comparison at block 318 may also be made based on context information received at block 314 (e.g. different commands may be executed based on the same orientation information in different contexts). For example, the location of device 10 may provide a context for device (e.g. control of an application as discussed below may be based on a combination of location information and orientation information). In some embodiments, the location information may be location within a boundary (e.g. location may be defined as a room of a house such as a living room, proximity to a tourist attraction, etc.). In some embodiments, location may be used to determine the closest pre-set point to the device 10. Location may be determined in any one or more of the manners discussed below, and/or in some other manner. Further, location may be determined from a location circuit 124 (e.g. a GPS circuit) of device 10, and/or may be received from a separate device (e.g. from a server 146 that provides location information to device 10). Context information based on location information may include static location information (e.g. based on the current position of device 10) and/or may be based on a change in location of device 10. For example, if location changes quickly, device 10 may be configured to determine that the device 10 is located in a car. Different commands based on the orientation information may be taken in a car than in other locations (and/or in a moving car than in a static car). As another example of determining context, a device 10 might become paired to another movable device (e.g. over a Bluetooth connection). Pairing to that movable device (and/or detecting the presence of that movable device) may provide a context of what is intended by a particular orientation of device 10 (particularly if the relative position of device 10 to the movable device is known or can be determined). As another example, the detection of several multiple devices can give further detail to position and orientation context as discussed above. As another example of determining context, a device 10 may be configured to provide different controls at block 328 based on time information (e.g. time of day information, date information such as day, day of week, week, month, year, etc.). For example, a user may only want to use certain orientation-based controls during a limited time period (e.g. while on vacation, while at a seminar, etc.). In some embodiments, the time information may be compared to data stored in a calendar application 216 (FIG. 3) to provide a context to the applications that might be controlled (e.g. may be positively compared such that certain actions can be taken if a certain activity is scheduled or may be negatively compared such that certain actions can only be taken if a particular activity is not scheduled—e.g. only when no activities or no subset of activities such as work-related activities are scheduled). Other contexts can be implied from various other factors which indicate the intent of a user when providing a particular orientation to device 10.

In some embodiments, the device implementing the method may be blind to the context. For example, the device may be programmed such that within a certain region (e.g. at a coordinate, within a defined range of a coordinate, etc.) the device will take certain actions at certain orientations. However, the device will not be programmed in a manner to understand the context provided by the location (e.g. will not know that it is in a user's home, or at a class of public location such as a coffee house, or at a place of interest such as a monument). The device simply follows the context programmed into it. As another example, a device may know that certain commands should be executed at certain orientations when certain other devices are also present even though the program of the device running the control method does not "understand" the context provided by the presence of the other devices (e.g. that being in proximity to the home stereo and home TV Bluetooth receivers indicates that a user is at their home and/or in their living room, that being in proximity to another mobile device indicates the likely presence of the owner of that other device, etc.). In some embodiments, the device implementing the method (e.g. the processing circuit of the device configured to implement the method) is aware of the context. In some embodiments, device 10 actively searches (e.g. through other applications, on a server, etc.) to determine the context provided by the data it receives. For example, device 10 could search a mapping database to determine if the location it received corresponds to a particular context such as being in proximity to a place of interest. As another example, device 10 may monitor the presence of Bluetooth signals from devices and may correlate those signals with other attendees listed for meetings in a user's calendar, and, after enough matches, may learn which signals are associated with which people. In some embodiments, the device implementing the method may be blind to at least some contexts provided while also being aware of other contexts.

If a match is found at block 318, then a feature of an application may be controlled at block 328. In addition to (or as an alternative to) controlling navigation-related features of applications (e.g. displayed heading, route-assistance, screen orientation, etc.), the orientation information may be used to control non-navigation features of an application. Examples of non-navigation features of an application that may be controlled include controlling a menu, controlling screen options displayed to a user, controlling a command associated with a reconfigurable dedicated button, controlling non-navigation information displayed to a user (e.g. in response to a user input), controlling a response to a user input device (e.g. button) input, providing an alert to a user, controlling control options provided to a user, etc. The control based on the application may be persistent (e.g. is the same no matter which application is being run on device 10) or may be application-specific (e.g. is unique to one or a group of applications such that the commands performed change based on the application running on device 10). The method may be implemented such that some controls are persistent while other controls are application-specific.

Controlling applications at block 328 may take one or more different forms. For example, controlling an application at block 328 may include changing which command is associated with a quick launch button of device 10. As another example, controlling an application at block 328 may include changing an order of applications and/or which applications are displayed on an easily accessible menu (e.g. from a quick launch menu of a main screen application of device 10) and/or a primary screen (e.g. the main screen of device 10, the main screen of a particular application running on device 10, etc.) and/or may change options on other menus and/or screens. As another example, controlling an application at block 328 may include changing the controls of multiple reconfigurable options—for example, options selectable by a soft key (e.g. a "key" formed on a touch screen input), options selectable by a hard key (e.g. a button, switch, wheel, or other similar physical input device) which may or may not be associated with a reconfigurable display, etc. As another example, controlling an application at block 328 may include providing an interrupt (e.g. providing a task reminder, providing a suggested action, taking a certain action without other user intervention, etc.) to a user of device 10. As another example, controlling an application at block 328 may include controlling a mode of an application. As another example, controlling an application at block 328 may include displaying information related to objects (tourist attractions, restaurants—menus, prices, etc., hotels, and/or other objects) in the area and orientation of device 10. As another example, controlling an application at block 328 may include a command that takes a single action (e.g. in a single application) or may include a macro command that controls multiple different actions by one or more different applications. The control at block 328 may be usable to control any function that a device 10 can perform including any of the functions discussed in this application. The control at block 328 may be used as shortcuts to applications, submenus (e.g. subfolders), and/or other application-related functions in some or all of these embodiments. Some embodiments may include some or all of the features of multiple examples described above as a single control at a particular orientation (e.g. in a particular orientation and context) and/or for different controls at different orientation.

In many embodiments, these controls are designed to be context-specific and thus make sense to the user. For example, in some embodiments the functions take place in the right place and when pointed at the right direction. In some embodiments, the use of a physical and spatial pointing gestures to both program/configure and then perform specific and/or desired commands may allow a user to be comfortable with the commands and the context in which they are performed.

In some embodiments, application data received at block 330 may be used to determine the control at block 328. For example, the action controlled at block 328 may be application specific. As another example, the application running, data collected by an application, and/or some other data related to an application may provide context for the control to implement (e.g. action to take) at a particular orientation. For example, if a Bluetooth receiver is turned on (e.g. recently turned on, in the on state, etc.), then the action controlled at block 328 may be selected from amongst actions related to use of the Bluetooth receiver. As another example, if a media application is running, the action controlled may be related to communication with external media players.

The database accessed at block 324 may be stored local to a device 10, may be received from a server 146, and/or may be received from some other source. In some embodiments, the database accessed at block 324 includes data stored local to device 10 and data stored external from device 10 (e.g. on a server 146).

The data in the database accessed at block 324 may be collected in any number of different manners. For example, in some embodiments, the database includes data received at block 326 from an external source (e.g. a data file received from a source 146, 150 separate from device 10). The data from the external source may be downloaded (e.g. from a server 146) in response to context information obtained at block 314, on a continual basis, periodically, etc. In some embodiments the data from the external source may be a data file loaded with preconfigured parameter sets. For example, a user may be provided with (e.g. on a computer or other terminal) a diagram (e.g. a diagram of a building such as a diagram of a user's room(s), a user's residence, a user's building, a user's office, a conference room, hotel room(s), a tourist attraction such as a state park or amusement park, etc.) and the user may assign orientation information (e.g. on the terminal) with certain actions using tools (e.g. icons) associated with the diagram (e.g. from an application on the terminal that is associated with the diagram). The locations illustrated in the diagram may be associated with physical locations (e.g. absolute location such as GPS or other coordinates, relative location such as relative location with respect to a beacon, etc.). The location and the orientation information assigned to certain actions may be saved as parameter sets in a data file, which data file may be provided to a user's device 10 (e.g. the file may be directly sent and saved on the device 10 or the file may be provided as warranted from a server system 146 to device 10). In some embodiments, a third party may create a data file (e.g. associated with a particular location and/or event). As another example, in some embodiments, a server 146 may collect data relating to the use of device 10 and may create parameter sets for a data file.

In some embodiments, the parameter sets may additionally (or alternatively) be created on the device 10 itself. In these embodiments, device 10 may receive a user input at block 320 which may be used to create a parameter set as discussed above for block 326. As another example of creating parameter sets on device 10, device 10 may receive a user input at block 320, orientation data from block 316 and/or context data from block 314 and create a parameter set at block 322 based on the user input, the orientation data, and the context data (e.g. device 10 may set the user input to correspond to the current context and orientation of device 10 when the user input is received at block 320). As another example, device 10 may monitor activity using device 10 (e.g. a common parameter set used to repeatedly command the same action on device 10) and may create a stored parameter set at block 322 to be stored in a database (locally or remotely) at block 324. In these embodiments, device 10 may have a programming mode where it is set to create parameter sets based on monitored activity and/or in response to user inputs, and may or may not have a non-programming mode where it does not create parameter sets based on one or both of these actions or only creates parameter sets in a more limited manner. In some embodiments, at least some portion of the programming mode may be persistent while device 10 is active.

In some embodiments, device 10 (or any other device—e.g. server 146—implementing the method) may be designed to always implement the method of FIG. 4. In other embodiments, the device implementing the method may be designed to have one or more modes where the method is implemented and one or more modes where the method is not implemented (and/or is only partially implemented). If a device has multiple modes, a mode may be selected (e.g. by a user action, based on context, based on a monitored criteria, etc.) at block 312. The method is implemented based on the mode selected. In some embodiments, selecting a mode at block 312 may be performed by a user using a hard key such as a switch or button, a soft key, a program option, by launching a particular application, and/or may be implemented by a user using some other method.

EXAMPLES

Example 1

A mobile smartphone includes a compass circuit and a gps circuit. The data from the compass circuit and GPS circuit are used to control which actions are taken by the smartphone.

Example 2

A mobile smartphone includes a compass circuit and a Bluetooth circuit. The Bluetooth circuit is designed to communicate with a Bluetooth signal source to determine the relative location of the smartphone compared to the beacon containing the Bluetooth signal source.

Example 3

A smartphone as described in one or both of the first two examples is configured to control a TV based on the orientation of the smartphone. A user first programs the smartphone to control the TV (e.g. may be a series of on-screen prompts, may be through selection of codes associated with the TV that are tested until a change is detected, may be by pairing the phone with the TV—e.g. through a Bluetooth connection, and/or may be through some other method). The user also programs the smartphone to provide quick access to the remote control functions of the smartphone when the smartphone is pointed at the TV while the smartphone is in the same room as the TV. In operation, when the smartphone is pointed at the TV, the smartphone is configured to send a signal to the TV to control the TV (e.g. using IR commands for TVs with IR receivers and using RF commands for TVs with RF receivers).

The user also programs the smartphone to provide other TV related functions at other orientations. When the back of the smartphone is pointed facing the TV, the smartphone accesses a particular server through a connection to a wireless transceiver (a local area network transceiver if one is available and a cellular transceiver if no local area network transceiver is available) and downloads a file containing current programming for the channels of the TV, such as a programming guide. When a user presses a quick access button, the smartphone displays the programming guide for TV shows that can be played on the TV.

Example 4

A smartphone as described in one or both of the first two examples is configured to provide commands relevant to locations for a user. The smartphone communicates its position to a server over a network. The server monitors the location of the smartphone and if the server determines that the smartphone is in the vicinity of a landmark of interest, the server sends a data file to the smartphone. The data file sent to the smartphone controls the smartphone to quick launch a camera application (e.g. using a reconfigurable dedicated button or as a shortcut) when the phone is placed in an orientation such that the camera of the phone is directed at the landmark. The file also sends an interrupt prompt to the user indicating that the user may want to take a picture of the landmark.

Example 5

A smartphone as described in one or both of the first two examples is configured to receive a file related to the location of the smartphone. In one example, the user downloads a file at a conference. The file quickly registers and connects the user to a wireless network when the device is pointed at a sign (set at a pre-designated point) relating to the wireless network.

In another example, when a user enters a park (e.g. an amusement park), a server automatically downloads a file to the smartphone. When the smartphone is laid flat and a dedicated button is pressed, a map of the park is displayed. When the smartphone is pointed at an attraction (e.g. a ride, a trail, etc.) and a user input is received, information relating to that attraction (age and height restrictions, wait time, trail length and conditions, etc.) and/or other media relating to that attraction (music, an instructional video, etc.) are provided.

In another example, a user may point the smartphone at a restaurant to obtain information relating to the restaurant and/or other restaurants in the area. The information may include menu selections, nutritional information, hours of operation, links for making reservations, and/or other information related to the restaurant. This same example may be applied to other types of businesses and/or other buildings as well (e.g. to identify the businesses and their location in a particular building).

Example 6

A smartphone as described in one or both of the first two examples is configured to allow a user to pre-set commands on the smartphone when the smartphone is in a programming mode. The user places the smartphone in the programming mode, sets the smartphone in the desired orientation in the desired location, and then uses an input to set up a command to perform in that orientation at that location.

As an example, the user sets the smartphone in the programming mode, sets the smartphone in an orientation facing the window in the user's bedroom, launches an internet browser and directs the browser to a website containing local weather information, and stores that website as the command to perform at that orientation in that location. In the operating mode, the user points the smartphone at their bedroom window and the smartphone launches the weather report website. In one version of this example, the user may assign the command to a button of the smartphone such that the user is required to hit the button to launch the website. In one version of this example, the user may set the command to only operate in the morning and on the weekends (or any other time that the user is most likely to check the weather) so that this command does not overlap or interfere with other orientation-based commands stored in the smartphone.

As another example, a user may set the smartphone in a programming mode, pair the smartphone with the user's stereo when the smartphone is in the desired orientation, launch a media player application on the smartphone, assign a button to the command, and store the parameter set with the macro to be executed. Subsequently, when a user points the smartphone at the stereo and presses the assigned button, the phone automatically pairs with the stereo and launches the media player application so that audio from the smartphone can be streamed to the stereo. The user might also set the macro to perform other functions such as send one or more signals from the smartphone to the stereo such as to turn the stereo on and to switch the stereo to a wireless audio streaming mode. In the same room at a different orientation, the user could set the smartphone to pair with the TV to perform similar or different functions.

Similar actions can be taken to allow the user to set a calendar application to launch when the smartphone is pointed at the user's desk, or a grocery list to be displayed when pointed at the kitchen and/or refrigerator.

Example 7

A smartphone as described in one or both of the first two examples is configured to monitor data from the orientation circuit, data from the location circuit, timing data, and data indicative of other devices in the vicinity (e.g. devices paired to the smartphone by a Bluetooth connection) to look for patterns by the user, and to create parameter sets for controlling the command(s) identified in the patterns if patterns of any two or more of these criteria are met. For example, a user might continually hold a smartphone in a particular orientation (e.g. in a holder) when they pair the smartphone with a computer to synch the smartphone and the computer. The smartphone identifies the pattern and creates a parameter set. When the parameters are met, the smartphone pairs to the computer and a soft key is displayed on the smartphone to allow the user to quickly synch the smartphone to the computer.

Example 8

A realtor sets beacons in predetermined locations in the house to be sold which allow orientation with respect to the beacons to be determined by a smartphone. The realtor uses an application running on a computer to assign information links (e.g. textual information, media information, etc.) to objects in the house based on their relative location to the beacons. The file is then sent to a smartphone of a person viewing the house such that the person can point their smartphone at a particular object (e.g. the electrical panel) and the information related to that object (e.g. the number of amps of service of the electrical system of the house) will be provided (e.g. displayed, played, etc.) to the person viewing the house on the smartphone.

Other Features

Referring back to FIG. 2, mobile device 10 may be a mobile computing device capable of executing software programs. The device 10 may be implemented as a combination handheld computer and mobile telephone, sometimes referred to as a smart phone. Examples of smart phones include, for example, Palm® products such as Palm® Treo™ smart phones. Although some embodiments may be described with mobile device 10 implemented as a smart phone by way of example, it may be appreciated that the embodiments are not limited in this context. For example, mobile device 10 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, camera, pager, messaging device, data communication device, and so forth.

Processing circuit 132 of hand-held device 10 may include one or more of a microprocessor 126, second microprocessor 126, image processing circuit 116, display driver 118, a memory (e.g. non-volatile memory—NVM) controller 128, audio driver 122 (e.g. D/A converter, A/D converter, an audio coder and/or decoder (codec), amplifier, etc.), and other processing circuits. Processing circuit 132 can include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 132 may include a central processing unit (CPU) using any suitable processor or logic device, such as a as a general purpose processor. Processing circuit 132 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

Processing circuit 132 may be configured to digitize data, to filter data, to analyze data, to combine data, to output command signals, and/or to process data in some other manner. Processing circuit 132 may be configured to perform digital-to-analog conversion (DAC), analog-to-digital conversion (ADC), modulation, demodulation, encoding, decoding, encryption, decryption, etc. Processing circuit 132 (e.g. an applications microprocessor 126) may be configured to execute various software programs such as application programs and system programs to provide computing and processing operations for device 10.

Processing circuit 132 may also include a memory that stores data. Processing circuit may include only one of a type of component (e.g. one microprocessor), or may contain multiple components of that type (e.g. multiple microprocessors). Processing circuit 132 could be composed of a plurality of separate circuits and discrete circuit elements. In some embodiments, processing circuit 132 will essentially comprise solid state electronic components such as a microprocessor (e.g. microcontroller). Processing circuit 132 may be mounted on a single board in a single location or may be spread throughout multiple locations which cooperate to act as processing circuit 132. In some embodiments, processing circuit 132 may be located in a single location (e.g. in proximity and/or on a common circuit carrying element such as a circuit board) and/or all the components of processing circuit 132 will be closely connected.

Components shown as part of a single processing circuit 132 in the figures may be parts of separate processing circuits in various embodiments covered by the claims unless limited by the claim to a single processing circuit (e.g. location circuit 124 may be part of a separate assembly having a separate microprocessor that interfaces with processing circuit 132 through data port 140).

Hand-held device 10 may also include a network transceiver 144. Transceiver 144 may operate using one or more of a LAN standard, a WLAN standard, a Bluetooth standard, a Wi-Fi standard, an Ethernet standard, and/or some other standard. Network transceiver 144 may be a wireless transceiver such as a Bluetooth transceiver and/or a wireless Ethernet transceiver. Wireless transceiver 144 may operate using an IEEE 802.11 standard. Hand-held device 10 may also include an external device connector 140 (such as a serial data port) for transferring data. External device connector 140 may also serve as the connector 135 between power supply circuit 152 and an external power supply. Hand-held device 10 may contain more than one of each of transceiver 144 and external device connector 140. For example, network transceiver 144 may include both a Bluetooth and an IEEE 802.11 transceiver.

Network transceiver 144 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of wireless network systems offering data communication services may include the Institute of Electrical and Electronics Engineers (IEEE) 802.xx series of protocols, such as the IEEE 802.11a/b/g/n series of standard protocols and variants (sometimes referred to as "WiFi"), the IEEE 802.16 series of standard protocols and variants (sometimes referred to as "WiMAX"), the IEEE 802.20 series of standard protocols and variants, and so forth.

Hand-held device 10 may be capable of operating as a mobile phone. The mobile phone may use transceiver 144 and/or may use a cellular transceiver 136. Cellular transceiver 136 may be configured to operate as an analog transceiver, a digital transceiver (e.g. a GSM transceiver, a TDMA transceiver, a CDMA transceiver), or some other type of transceiver. Cellular transceiver 136 may be configured to transfer data (such as image files) and may be used to access the Internet 142 in addition to allowing voice communication. Cellular transceiver 136 may be configured to use one or more of an EV-technology (e.g. EV-DO, EV-DV, etc.), an EDGE technology, a WCDMA technology, and/or some other technology.

Transceiver 144 may be arranged to perform data communications in accordance with different types of shorter range wireless systems, such as a wireless personal area network (PAN) system. One example of a wireless PAN system offering data communication services includes a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), etc.—as well as one or more Bluetooth Profiles, etc. Other examples may include systems using an infrared technique.

Cellular transceiver 136 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth.

In addition to voice communications functionality, the cellular transceiver 136 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

Hand-held device 10 may include one or more user input devices 131 (e.g. button, switch, touch screen, keyboard, keypad, voice command circuit, etc.) for registering commands from a user on device 10. Some or all of user input devices 131 may interface with a switch control circuit (not shown) configured to interpret which switches have been actuated. User input device 131 may include an alphanumeric keyboard. The keyboard may comprise, for example, a QWERTY key layout and an integrated number dial pad. A keyboard integrated into a hand-held device would typically be a thumb keyboard. User input device 131 may also include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. Any of user input devices 131 may be concealable behind a body (e.g. a sliding body, a flip-out body, etc.) such that they are hidden when the body is in a first position and visible when the body is in the second position.

Hand-held device 10 may include one or more location determining circuits 124 (e.g. a GPS circuit and/or a cell-based location determining circuit) configured to determine the location of device 10. Device 10 may be configured to receive inputs from more than one location determining circuit 124. These inputs can be compared such that both are used, one (e.g. a cell-based system) can be used primarily when the other (e.g. GPS) is unable to provide reliable location information, or can have some other functional relationship.

Device 10 may use one or more different location determining techniques to derive the location of the device 10 based on the data from location determining circuit 124.

For example, device 10 may use one or more of Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more position determination modes including, for example, a standalone mode, a mobile station (MS) assisted mode, and/or a MS-based mode. In a standalone mode, such as a standalone GPS mode, the mobile computing device 10 may be arranged to autonomously determine its position without network interaction or support. When operating in an MS-assisted mode or an MS-based mode, however, device 10 may be arranged communicate over a radio access network (e.g., UMTS radio access network) with a position determination entity (PDE) such as a location proxy server (LPS) and/or a mobile positioning center (MPC).

In an MS-assisted mode, such as an MS-assisted AGPS mode, the PDE may be arranged to determine the position of the mobile computing device. In an MS-based mode, such as an MS-based AGPS mode, device 10 may be arranged to determine its position with only limited periodic assistance from the PDE. In various implementations, device 10 and the PDE may be arranged to communicate according a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting device 10, the PDE may handle various processing operations and also may provide information to aid position determination. Examples of assisting information may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth.

In various implementations, the assisting information provided by the PDE may improve the speed of satellite acquisition and the probability of a position fix by concentrating the search for a GPS signal and/or may improve the accuracy of position determination. Each position fix or series of position fixes may be available at device 10 and/or at the PDE depending on the position determination mode. In some cases, data calls may be made and assisting information may be sent to device 10 from the PDE for every position fix. In other cases, data calls may be made and assistance information may be sent periodically and/or as needed.

In some embodiments, device 10 may determine its position and/or orientation from a beacon (e.g. a wireless signal transmitter) set at a predetermined location. Proximity to and orientation with respect to one or more beacons can be used to determine the location and/or orientation of device 10. In some embodiments, beacons may be used to identify particular rooms of a building and/or locations within a building.

Device 10 may also include an orientation circuit 160. Orientation circuit 160 may be one or more of any number of circuits configured to provide data indicative of an orientation of device 10 (e.g. of a direction in which device 10 is pointed). In some embodiments, orientation circuit 160 may be a compass sensor circuit configured to sense a magnetic field (e.g. Earth's magnetic field) that provides information indicative of an orientation of device 10, may include an accelerometer or other circuit responsive to Earth's gravitational field, may include one or more gyros, a multiple (e.g. two or three) antenna GPS system with sufficient resolution to determine orientation, a wireless receiver (e.g. a transceiver) that receives a signal from a beacon that is indicative of the relative orientation of the device to the beacon, and/or some other orientation circuit. In some embodiments, orientation circuit 160 may be separate from (although may be connected to) device 10 and provide orientation data to device 10 through a data link (e.g. through a wireless data link). In some embodiments, orientation circuit 160 may be configured to provide a continuous orientation when operation and receiving a relevant signal (e.g. a compass circuit, a multiple antenna GPS system, a WiFi positioning system, etc.) while in other embodiments orientation circuit 160 may only provide orientation information when some other parameter is met (e.g. a single antenna GPS system designed to provide general orientation information only when the device 10 is moving).

Hand-held device 10 may include one or more audio circuits 120 (e.g. speakers, microphone, etc.) for providing or receiving audio information to or from a user. In one example, hand-held device 10 includes a first speaker 120 designed for regular phone operation. Hand-held device 10 may also include a second speaker 120 for louder applications such as speaker phone operation, music or other audio playback (e.g. an mp3 player application), etc. Hand-held device 10 may also include one or more audio ports 120 (e.g. a headphone connector) for output to an external speaker and/or input from an external microphone. Audio circuit 120 may be under the control of one or more audio drivers 122 which may include D/A converters and/or an amplifier.

Hand-held device 10 may include a camera 112 for taking pictures using device 10. Camera 112 may include a CCD sensor, a CMOS sensor, or some other type of image sensor capable of obtaining an image (particularly, images sensors capable of obtaining an image formed as an array of pixels). The image sensor may have a resolution of at least about 65,000 pixels or at least about 1 megapixel. In some embodiments, the image sensor may have a resolution of at least about 4 megapixels. Camera 112 may also include read-out electronics for reading data from the image sensor. Image processing circuit 116 may be coupled to the camera 112 for processing an image obtained by the camera. This image processing may include format conversion (e.g. RGB to YCbCr), white balancing, tone correction, edge correction, red-eye reduction, compression, CFA interpolation, etc. Image processing circuit 116 may be dedicated hardware that has been optimized for performing image processing.

Hand-held device 10 may include a display 114 for displaying information to a user. Display 114 could be one or more of an LCD display (e.g. a touch-sensitive color thin-film transistor (TFT) LCD screen), an electroluminescent display, a carbon-nanotube-based display, a plasma display, an organic light emitting diode (OLED) display, and some other type of display. Display 114 may be a touch screen display such that a user may input commands by approaching (e.g. touching) display 114 (including touch screens that require a specialized device to input information). Display 114 may be a color display (e.g., 16 or more bit color display) or may be a non-color (e.g. monotone) display. Display 114 may be controlled by a display driver 118 that is under the control of a microprocessor 126. In some embodiments, display 114 may be used with a stylus. Display 114 may be used as an input to a handwriting recognizer application.

Hand-held device 10 may include a dedicated memory 134 fixed to device 10. Memory 134 may be implemented using any machine-readable or computer-readable media capable of storing data such as erasable or non-erasable memory, writeable or re-writeable memory, and so forth. Dedicated memory 134 may be a non-volatile memory, may be a volatile memory, or may include both volatile and non-volatile memories. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. In one embodiment, fixed memory 134 is a non-volatile memory.

Although the memory 134 is shown as being separate from and external to processing circuit 132 some portion or the entire memory 134 may be included on the same integrated circuit as processing circuit 132 (e.g. the same integrated circuit as microprocessor 126).

Hand-held device 10 may include a removable memory port 138 configured to receive a removable memory medium, and/or other components. Removable memory port 138 may also serve as an external device connector 140. For example, removable memory port may be an SDIO card slot which can be used to receive memory cards, receive cards input and/or output data, and combined cards having both memory and input/output functions.

Memory 134 and/or memory 138 may be arranged to store one or more software programs to be executed by processing circuit 132.

Dedicated memory 134 and removable memory 138 may be connected to and/or under the control of a common memory controller 128 such as a non-volatile memory controller. Memory controller 128 may be configured to control reading of data to and writing of data from dedicated memory 134 and/or removable memory 138.

Handheld device 10 may be configured to connect to one or more servers 146,148 via a network 142 (such as the Internet) using one or more of network transceiver 144, cellular transceiver 136, and external device connector 140.

Hand-held device 10 may also include a power supply circuit 152 configured to regulate power supply in hand-held device 10. Power supply circuit 152 may be configured to do one or more of control charging of battery 156, to communicate the amount of power remaining in battery 156, determine and/or communicate whether an external power supply is connected, switch between the external power supply and the battery, etc. Battery 156 may be a rechargeable battery and may be removable or may be fixed to device 10. Battery 156 may be formed from any number of types of batteries including silver-based batteries (e.g. silver-zinc, magnesium-silver-chloride, etc.), a lithium-based battery (e.g. lithium-ion, lithium-polymer, etc.), a nickel-based battery (nickel-cadmium, nickel-metal-hydride, etc.), zinc-based batteries (e.g. silver-zinc, carbon-zinc, etc.), etc. External power supply connector 135 may be configured to be connected to a direct current source, an alternating current source, or both DC and AC sources.

Device 10 may have an optical viewfinder (not shown), may use display 114 as a digital viewfinder, may include some other type of view finder, may include multiple types of view finders, or may not include a view finder.

Device 10 may be configured to connect to the Internet 142, which may be a direct connection (e.g. using cellular transceiver 136, external device connector 140, or network transceiver 144) or may be an indirect connection (e.g. routed through external device 150). Device 10 may receive information from and/or provide information to the Internet. Device 10 may include a web browser configured to display information received from the Internet (including information which may be optimized by the browser for display on mobile device 10). Device 10 may connect to one or more remote servers 146,148 using the Internet. Device 10 could also connect to another personal electronic device 150 by way of the Internet.

Device 10 may comprise an antenna system (not illustrated) for transmitting and/or receiving electrical signals. Each of the transceivers 136, 144 and/or location circuit 124 may include individual antennas or may include a common antenna system. The antenna system may include or be implemented as one or more internal antennas and/or external antennas.

Mobile device 10 may comprise a subscriber identity module (SIM) coupled to processing circuit 132. The SIM may comprise, for example, a removable or non-removable smart card arranged to encrypt voice and data transmissions and to store user-specific data for allowing a voice or data communications network to identify and authenticate the user. The SIM may store data such as personal settings specific to the user.

Referring to FIG. 3, device 10 and/or processing circuit 132 may be configured to run any number of different types of applications. Examples of application programs may include, for example, a phone application 230 (e.g. a telephone application, a voicemail application, a VoIP application, etc.), a messaging application 202 (e.g. an e-mail application, an instant message (IM) application, a short message service (SMS) application, a multimedia message service (MMS) application), a web browser application 228, a personal setting application 210 (e.g. a personal information manager (PIM) application), a contact management application 218, a calendar application 216 (e.g. a calendar application, a scheduling application, etc.), a task management application 222, a document application (e.g. a word processing application, a spreadsheet application, a slide application, a document viewer application, a database application, etc.), a location application 214 (e.g. a positioning application, a navigation application, etc.), an image application 212 (e.g. a camera application such as a digital camera application and/or a video camera application, an image management application, etc.) including media player applications (e.g. a video player application, an audio player application, a multimedia player application, etc.), a gaming application, a handwriting recognition application, and so forth. The application software may provide a graphical user interface (GUI) to communicate information between the mobile device 10 and a user.

Device 10 may include a location application 214. Location application 214 may be configured to calculate the current position (e.g. the rough current position) of device 10 based on data received from one or more location determining circuits 124. Location application 214 may be provided with map information such that it can translate coordinate positions into map positions (and vice versa). Location application 214 may be configured to provide navigational information to a user such as turn by turn directions.

Device 10 may include personal organizer applications such as a calendar application 216, a contacts application 218, and a task application (not illustrated). Calendar application 216 may allow a user to schedule events, set alarms for events, and store a wide variety of information for events (e.g. name of the event, location of the event, other attendees of the event, etc.). Contacts application 218 may allow a user to save contact information for a contact such as phone number information (which may be shared with a phone application 230), address information, group information (e.g. which user created group or groups the contact belongs to), and other information about the contact. The task application allows a user to keep track of pending and/or completed tasks.

Device 10 may include an internal clock application 224 that keeps track of time information (such as current time of day and/or date), time zone information, daylight savings time information, etc. Clock application 224 may be a program running based on data from an internal clock of microprocessor 126, data from a separate clock/timing circuit, or data from some other circuit.

Device 10 may also include one or more network connection protocol applications 226 that allow a user to transfer data over one or more networks. Network application 226 may be configured to allow device 10 to access a remote device such as server 146,148.

Device 10 may include an Internet browser application 228 that allows a user to browse the internet The Internet browser application may be configured to alter the data received from Internet sites so that the data can be easily viewed on mobile device 10.

Device 10 may include a phone application 230 configured to allow a user to make phone calls. Phone application 230 may use contact information from contact application 218 to place phone calls.

Device 10 may also include one or more messaging applications 202 that allow a user to send and/or receive messages such as text messages, multi-media messages, e-mails, etc. E-mail messages may come from a server which may use a Push technology and/or may use a pull technology (e.g. POP3, IMAP, etc.).

Any of the information discussed above for any of the applications (e.g. applications 202-228) may be added to or otherwise associated with an image file.

Referring to FIGS. 1-2, a hand-held portable computing device 10 (e.g. a mobile computing device such as a smartphone) includes a number of user input devices 131. The user input devices include a send button 4 configured to select options appearing on display 3 and/or send messages, a 5-way navigator 5 configured to navigate through options appearing on display 3, a power/end button 6 configured to select options appearing on display 3 and to turn on display 3, a phone button 7 usable to access a phone application screen, a calendar button 8 usable to access a calendar application screen, a messaging button 9 usable to access a messaging application screen, an applications button 60 usable to access a screen showing available applications, a thumb keyboard 11 (which includes a phone dial pad 12 usable to dial during a phone application), a volume button 19 usable to adjust the volume of audio output of device 10, a customizable button 20 which a user may customize to perform various functions, a ringer switch 22 usable to switch the smartphone from one mode to another mode (such as switching from a normal ringer mode to a meeting ringer mode), and a touch screen display 3 usable to select control options displayed on display 3. Touch screen display 3 is also a color LCD display 114 having a TFT matrix.

Smartphone 10 also includes audio circuits 120. The audio circuits 120 include phone speaker 2 usable to listen to information in a normal phone mode, external speaker 16 louder than the phone speaker (e.g. for listening to music, for a speakerphone mode, etc.), headset jack 23 to which a user can attach an external headset which may include a speaker and/or a microphone, and microphone 25 which can be used to pick up audio information such as the user's end of a conversation during a phone call.

Smartphone 10 also includes a status indicator 1 that can be used to indicate the status of Smartphone 10 (such as messages pending, charging, low battery, etc.), a stylus slot 13 for receiving a stylus such as a stylus usable to input data on touch screen display 3, a digital camera 15 (see camera 112) usable to capture images, a mirror 14 positioned proximate camera 15 such that a user may view themselves in mirror 14 when taking a picture of themselves using camera 15, a removable battery 18 (see battery 156), and a connector 24 (see external data connector 140 and external power supply connector 135) which can be used to connect device 10 to either (or both) an external power supply such as a wall outlet or battery charger or an external device such as a personal computer, a gps unit, a display unit, or some other external device.

Smartphone 10 also includes an expansion slot 21 (see removable memory 138) which may be used to receive a memory card and/or a device which communicates data through slot 21, and a SIM card slot 17, located behind battery 18, configured to receive a SIM card or other card that allows the user to access a cellular network.

In various embodiments device 10 may include a housing 40. Housing 40 could be any size, shape, and dimension. In some embodiments, housing 40 has a width 52 (shorter dimension) of no more than about 200 mm or no more than about 100 mm. According to some of these embodiments, housing 40 has a width 52 of no more than about 85 mm or no more than about 65 mm. According to some embodiments, housing 40 has a width 352 of at least about 30 mm or at least about 50 mm. According to some of these embodiments, housing 40 has a width 52 of at least about 55 mm.

In some embodiments, housing 40 has a length 54 (longer dimension) of no more than about 200 mm or no more than about 150 mm. According to some of these embodiments, housing 40 has a length 54 of no more than about 135 mm or no more than about 125 mm. According to some embodiments, housing 40 has a length 54 of at least about 70 mm or at least about 100 mm. According to some of these embodiments, housing 40 has a length 54 of at least about 110 mm.

In some embodiments, housing 40 has a thickness 50 (smallest dimension) of no more than about 150 mm or no more than about 50 mm. According to some of these embodiments, housing 40 has a thickness 50 of no more than about 30 mm or no more than about 25 mm. According to some embodiments, housing 40 has a thickness 50 of at least about 10 mm or at least about 15 mm. According to some of these embodiments, housing 40 has a thickness 50 of at least about 50 mm.

While described with regards to a hand-held device, many embodiments are usable with mobile devices which are not handheld and/or with non-mobile devices/systems.

Also, while the claims may describe embodiments that require particular features, claims that use the term comprising are intended to cover any device that includes those features even if the device also includes additional features unless the claim recites that a particular component (e.g. a processing circuit) is configured to "solely" perform a particular function or the device "solely" includes a particular type of component when configured as recited in the claim. Use of the term "each" in the claim is not intended to mean "solely" or to curtail the meaning of the term "comprising," but rather is meant to refer to each element used to satisfy the recited element (i.e. a device may include additional components similar to the "each" component so long as components are also present in a manner that satisfies the "each" element of the claim) unless the claim element uses the term "solely" to modify the "each" element. All combinations of the features disclosed above are contemplated as members of an open "comprising" element and a closed "solely" element, and combinations thereof. Moreover, reference to "a" element is not directed to a single one of that element unless the claim recites "a single" element or feature of the element.

The various single applications discussed above may be performed by multiple applications where more than one application performs all of the functions discussed for the application or where one application only performs some of the functions discussed for the application. For example, the image application 212 may be divided into an image capturing application and a separate image viewing application. Also, more than one application may be included on device 10 that is capable of displaying images as described for image application 212.

Further, while shown as separate applications above, many of the above listed applications can be combined into single applications that perform all or some of the functions listed for more than one of the applications discussed above.

While some components in FIG. 2 were discussed as being singular and others were discussed as being plural, the invention is not limited to devices having these same numbers of each type of component. Embodiments are conceived where each combination of plural and singular components exist.

In some embodiments, the various components shown in FIG. 2 may be combined in a single component. For example, in some embodiments, removable memory 138 may also be an external device connector 140 (such as an SDIO card slot which can be used to receive memory cards, input and/or output data, and combined devices having both memory and input/output functions). As another example, in some embodiments, a single connector could serve as both an external device connector 140 and as a connection to an external power supply connector 135.

Also, in some embodiments, the function of various claim components shown in FIG. 2 may be performed by a combination of distinct electrical components. For instance, a location determining circuit 124 may have a separate microprocessor that works in combination with the main microprocessor 126 of the system to perform the functions of the processing circuit 132. As another example, image processing circuit 116 may make use of the electronics of camera 112 to perform image processing, while also having other, discrete electronic components.

What is claimed is:

1. A mobile device, comprising:
   a memory on which is stored sets of pre-programmed machine readable instructions regarding interactions with a plurality of electronic apparatuses that are external to the mobile device, wherein each set of pre-programmed machine readable instructions is associated with one of the plurality of electronic apparatuses, wherein a determination as to which of the plurality of pre-programmed machine readable instructions is to be executed is dependent upon an orientation of the mobile device;
   an orientation circuit to provide orientation data indicative of the orientation of the mobile device;
   a processing circuit to receive orientation information based on the orientation data, to determine with which of the plurality of electronic apparatuses to interact based upon the orientation information, and to execute the pre-programmed machine readable instructions associated with the determined electronic apparatus, and wherein the processing circuit is to perform a first action in response to a user input at a first location when the device is in a first orientation and to perform a second action, different than the first action, in response to the user input at the first location when the device is in a second orientation, different than the first orientation.

2. The mobile device of claim 1, further comprising:
   a location circuit to provide location data indicative of a location of the mobile device, wherein the orientation circuit comprises a compass circuit and the location circuit comprises a global positioning system circuit.

3. The mobile device of claim 1, further comprising:
   at least one of a hard key and a soft key user input device, wherein the user input comprises a user input on at least one of the hard key and the soft key user input device.

4. The mobile device of claim 1, wherein the processing circuit is to communicate at least one command directed to the determined electronic apparatus from the mobile device.

5. A mobile device comprising:
   a memory on which is stored sets of pre-programmed machine readable instructions regarding interactions with a plurality of electronic apparatuses that are external to the mobile device, wherein each set of pre-programmed machine readable instructions is associated with one of the plurality of electronic apparatuses, wherein a determination as to which of the plurality of pre-programmed machine readable instructions is to be executed is dependent upon an orientation of the mobile device; and
   a processing circuit to receive information indicative of an orientation of the mobile device, to determine with which of the plurality of electronic apparatuses to interact based on the information indicative of the orientation, and to execute the pre-programmed machine readable instructions associated with the determined electronic apparatus, and wherein the processing circuit is to perform a first action in response to a user input at a first location when the device is in a first orientation and to perform a second action, different than the first action, in response to the user input at the first location when the device is in a second orientation, different than the first orientation.

6. The mobile device of claim 5, further comprising an orientation circuit to provide orientation data, wherein the information indicative of an orientation of the mobile device is based on the orientation data.

7. The mobile device of claim 6, wherein the orientation circuit comprises a compass circuit.

8. The mobile device of claim 5, wherein the processing circuit is further to receive context information and is to execute the pre-programmed machine readable instructions associated with the determined electronic apparatus based on the information indicative of the orientation and the context information.

9. The mobile device of claim 8, wherein the context information comprises location information indicative of a location of the mobile device.

10. The mobile device of claim 9, further comprising a location circuit to provide location data, wherein the location information is based on the location data.

11. The mobile device of claim 10, wherein the location circuit comprises a receiver to receive location signals, wherein the processing circuit is to calculate a location based on the location signals received.

12. The mobile device of claim 5, wherein the processing circuit is to communicate a command directed to the determined electronic apparatus from the mobile device through execution of the pre-programmed machine readable instructions in response to a user input.

13. The mobile device of claim 5, wherein the processing circuit is to communicate different sets of commands to different ones of the electronic apparatuses through execution of different sets of pre-programmed machine readable instructions.

14. The mobile device of claim 5, further comprising:
    a display; and
    wherein the processing circuit is to control the display to display different sets of information relating to the plurality of electronic apparatuses, wherein the set of information displayed is dependent upon the direction in which the mobile device is directed.

15. The mobile device of claim 14, wherein the different sets of information comprise different menus associated with different ones of the plurality of electronic apparatuses.

16. The mobile device of claim 5, wherein the sets of pre-programmed machine readable instructions are customizable by a user.

17. The mobile device of claim 5, wherein the processing circuit is to communicate wirelessly with the plurality of electronic apparatuses to determine relative orientations between the mobile device and the plurality of electronic apparatuses.

18. The mobile device of claim 5, wherein the processing circuit is to control a set of machine readable instructions to launch different short-cuts based on different orientations of the mobile device.

19. The mobile device of claim 5, wherein the processing circuit has a programming mode in which the processing circuit is to receive programming orientation information indicative of an orientation of the mobile device, a user input indicative of a command to execute at the programming orientation of the device, to save command information based on the programming orientation and the user input indicative of the command to execute, wherein the processing circuit is to execute the saved command based on the information indicative of the orientation.

20. The mobile device of claim 5, wherein the processing circuit is to execute different sets of machine readable instructions based on different orientations of the mobile device.

21. The mobile device of claim 5, wherein
the processing circuit is further to receive data indicative of user programming inputs, the data indicative of user programming inputs representing user inputs of at least one feature to control in at least one context at at least one orientation, and to receive data indicative of a context of the mobile device, and
the processing circuit is to control a feature of a set of machine readable instructions based on the information indicative of the orientation by controlling the feature of the set of machine readable instructions based on the information indicative of the orientation and the data indicative of the context in relation to data based on the data indicative of user programming inputs.

22. The mobile device of claim 5, wherein the processing circuit is to control a feature of a set of machine readable instructions based on data indicative of the orientation and data indicative of context while being blind to the context.

23. The mobile device of claim 5, wherein the processing circuit is configured to control a feature of a set of machine readable instructions based on data indicative of the orientation and data indicative of context where the context is unrelated to map data.

24. The mobile device of claim 5, wherein the processing circuit is to control a feature of a set of machine readable instructions based on data indicative of the orientation and data indicative of context where the context does not include data that the processing circuit can use to define the coordinate location of the mobile device.

25. The mobile device of claim 5, wherein the processing circuit is to control the feature of a set of machine readable instructions based on data indicative of the orientation and data indicative of context where the data indicative of context is provided from at least one source unrelated to a coordinate location of the mobile device.

* * * * *